(12) United States Patent
Havens et al.

(10) Patent No.: US 6,177,371 B1
(45) Date of Patent: Jan. 23, 2001

(54) PHOTOCHROMIC GLASS AND LENS

(75) Inventors: Thomas G. Havens, Painted Post; David J. Kerko; Brent M. Wedding, both of Corning, all of NY (US)

(73) Assignee: Corning S.A., Avon Cedex (FR)

(*) Notice: Under 35 U.S.C. 154(b), the term of this patent shall be extended for 0 days.

(21) Appl. No.: 09/289,520

(22) Filed: Apr. 9, 1999

Related U.S. Application Data

(60) Provisional application No. 60/064,901, filed on Nov. 7, 1997.

(51) Int. Cl.[7] ............................................ C03C 4/06
(52) U.S. Cl. .............................. 501/13; 501/66; 501/67; 501/77
(58) Field of Search ......................... 501/13, 66, 67, 501/77

(56) References Cited

U.S. PATENT DOCUMENTS

| | | | |
|---|---|---|---|
| 3,208,860 | 9/1965 | Armistead et al. | 106/54 |
| 4,190,451 | 2/1980 | Hares et al. | 106/47 |
| 4,284,686 | 8/1981 | Wedding | 428/334 |
| 5,104,831 | * 4/1992 | Behr et al. | 501/13 |
| 5,300,465 | * 4/1994 | Grateau et al. | 501/13 |
| 5,381,193 | 1/1995 | Wedding | 351/163 |
| 5,424,255 | * 6/1995 | Kassner | 501/13 |
| 5,639,701 | * 6/1997 | Kerko et al. | 501/13 |
| 5,728,189 | * 3/1998 | Kerko et al. | 65/32.1 |
| 5,973,865 | * 10/1999 | Havens et al. | 359/885 |

* cited by examiner

Primary Examiner—Karl Group
(74) Attorney, Agent, or Firm—Milton M. Peterson

(57) ABSTRACT

A fixed tint, photochromic glasses and sunglass lenses produced therefrom. The glasses have $R_2O$—$Al_2O_3$—$B_2O_3$—$SiO_2$ base compositions, contain silver chloride and bromide contents as photochromic constituents and 0.27–0.38% and 0.035–0.060%, both by weight percent, as glass colorants, the $NiO:Co_3O_4$ ratio being at least 6:1.

10 Claims, 1 Drawing Sheet

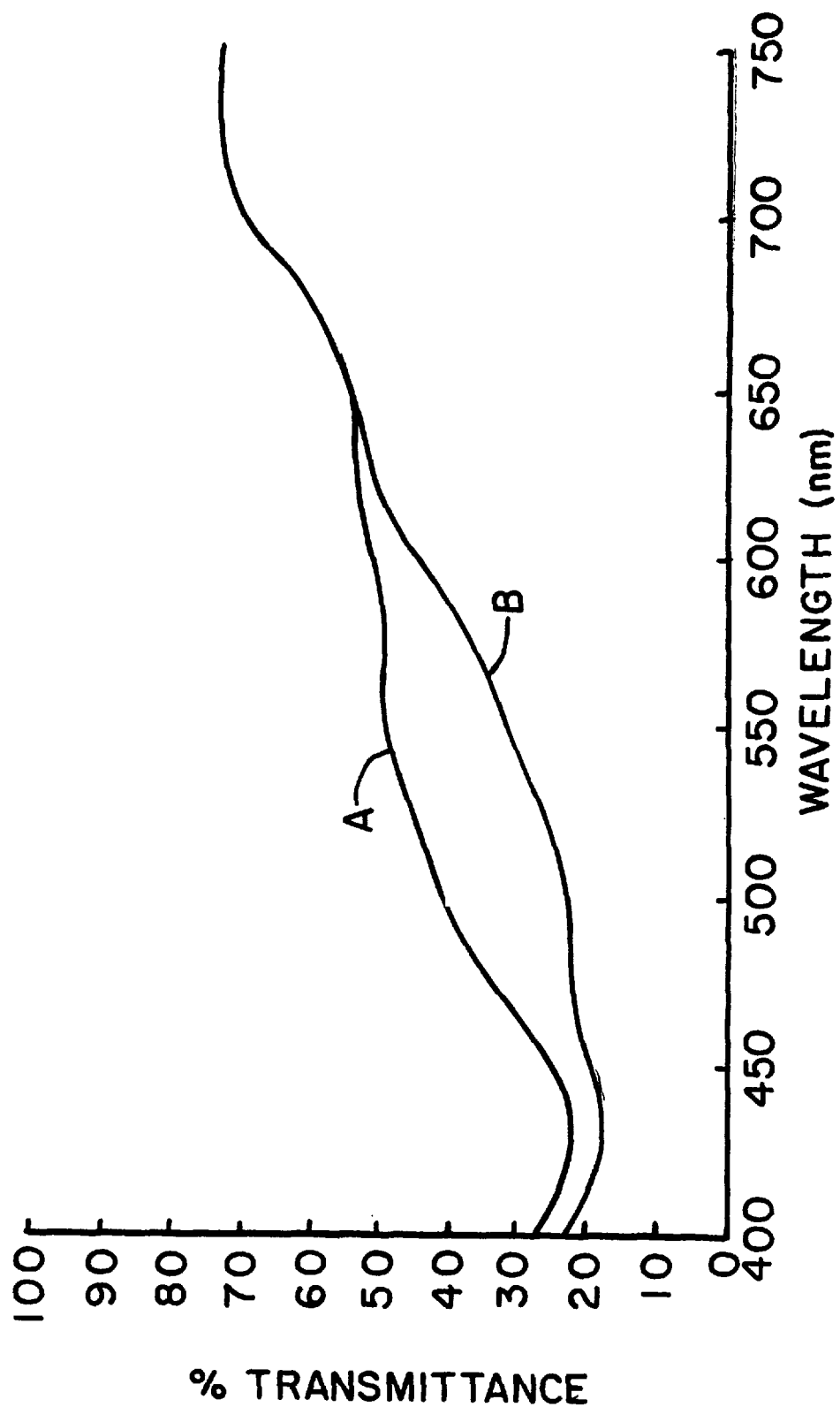

PHOTOCHROMIC GLASS AND LENS

This application claims the benefit of U.S. Provisional Application, Serial No. 60/064,901, filed Nov. 7, 1997 entitled PHOTOCHROMIC GLASS AND LENS, by Thomas G. Havens, David J. Kerko and Brent M. Wedding.

FIELD OF THE INVENTION

Fixed tint, photochromic glasses, and sunglass lenses produced from such glasses.

BACKGROUND OF THE INVENTION

Photochromic glasses characteristically darken under the influence of short wavelength radiation, and fade when the radiation source is removed. Such glasses have become well-known since their disclosure in U.S. Pat. No. 3,208,860 (Armistead et al.).

Initially, the active photochromic ingredient was crystals of a silver halide, other than the fluoride. Subsequently, glasses containing copper and cadmium halides were found to be photochromic, but the silver halide glasses have remained the commercial choice.

Continuing efforts were made to improve the early glasses with respect to both their photochromic properties and their other properties necessary for ophthalmic use. These efforts led to U.S. Pat. No. 4,190,451 (Hares et al.). This patent discloses an $R_2O$—$Al_2O_3$—$B_2O_3$—$SiO_2$ base glass containing, as essential constituents for photochromism, Ag 0.15–0.3%, 0.1–0.25% Cl, 0.1–0.2% Br and 0.004–0.02% CuO by weight. The patent also discloses the possibility of adding up to one percent transition metal oxides, such as CoO, NiO and $Cr_2O_3$, and up to five percent rare earth metal oxides, such as $Er_2O_3$, as glass colorants.

A composition for a commercial, photochromic sunglass was developed on the basis of the Hares et al. patent teachings. This glass has a base glass composition, as calculated in parts by weight from the glass batch, of

| $SiO_2$ | 56.46 | $Na_2O$ | 4.08 |
| --- | --- | --- | --- |
| $Al_2O_3$ | 6.19 | $K_2O$ | 5.72 |
| $B_2O_3$ | 18.15 | $ZrO_2$ | 4.99 |
| $Li_2O$ | 1.81 | $TiO_2$ | 2.09 |

The glass contains photochromic elements as follows:

| Ag | 0.252 |
| --- | --- |
| Cl | 0.195 |
| Br | 0.155 |
| CuO | 0.006 |

The glass also has 0.122% NiO and 0.017% $Co_3O_4$ added to impart a fixed tint.

This glass, as melted, has a faded transmittance of 70%. When fired in hydrogen, the faded transmittance of the glass is reduced to 45+/−2%. However, a lens having an even lower, faded transmittance after hydrogen treatment was found to be desirable.

This could be achieved by a more extended hydrogen treatment in terms of time and/or temperature. However, such extended treatment resulted in a color shift that created a very undesirable cosmetic appearance. Also, after UV darkening, as by sunlight, a sunglass lens failed to meet the ISO/ANSI sunglass requirements.

To achieve the desired transmittance with acceptable color, it became necessary to apply a combination of coatings including a neutral density, durable, thin film coating. This expedient effectively provided a faded transmittance of about 26% and a UV-darkened transmittance of about 12% at 25° C. However, the extra processing added considerable cost to the lens.

The present invention is predicated on discovery that the need for a coating can be avoided by modifying and controlling the amounts of the colorant oxide. The resulting lens, in a standard 2.0+/−0.1 mm. thickness satisfies the ISO/ANSI requirements, as well as other ophthalmic requirements. These include a refractive index of about 1.53, an ability to be chemically strengthened to meet the FDA ball-drop test and a cosmetically acceptable appearance.

It is then a basic purpose of the present invention to produce an improved, darker sunglass lens.

Another purpose is to provide a fixed tint, photochromic glass from which such lens can be produced.

A further purpose is to provide a sunglass lens that possesses the properties of a coated lens while avoiding the costly coating procedure.

Another purpose is to provide a fixed tint, photochromic glass lens that has an acceptable color and diminished transmission in the undarkened state, but still satisfies ISO/ANSI sunglass requirements when darkened.

A still further purpose is to accomplish the forgoing purposes while modifying only the colorants in a commercial glass.

SUMMARY OF THE INVENTION

The invention resides in an $R_2O$—$Al_2O_3$—$B_2O_3$—$SiO_2$ base glass containing silver chloride and bromide as photochromic constituents and 0.27–0.38% NiO and 0.035–0.060% $Co_3O_4$ as glass colorants with the ratio of NiO:$Co_3O_4$ being at least 6:1 by weight.

The invention further resides in an ophthalmic lens composed of such glass and having a refractive index of about 1.523 and a thickness of 1.6–2.0 +/−0.1 mm.

PRIOR ART

Patent literature known to Applicants and deemed of possible relevance is supplied separately.

BRIEF DESCRIPTION OF THE DRAWINGS

The single FIGURE in the accompanying drawing is a graphical representation showing transmittance curves for a glass in accordance with the present invention before and after the glass is fired in a reducing atmosphere.

DESCRIPTION OF THE INVENTION

The present invention arose from studies designed to obtain a darker, fixed tint, photochromic lens having a low transmittance in the faded state, but still meeting ISO/ANSI sunglass requirements when the lens is exposed to UV radiation. As indicated, this could be achieved with a coating, but that involved added processing.

We have now discovered that the desired lower transmittance in the hydrogen-fired lens, can be achieved by modifying the relevant amounts of glass colorants employed to produce the fixed tint. Thus, the $R_2O$—$Al_2O_3$—$B_2O_3$—$SiO_2$ base glass, including the photochromic constituents, remains unchanged from that heretofore commercially available. This, of course, is desirable since schedules for glass strengthening can remain unchanged. Also, no changes in glass melting procedures are required.

The base glass, as calculated from the batch on an oxide basis, consists essentially of:

| | | | |
|---|---|---|---|
| $SiO_2$ | 20–65% | $Na_2O$ | up to 9% |
| $Al_2O_3$ | 5–25% | $K_2O$ | up to 17% |
| $B_2O_3$ | 14–23% | $R_2O$ | 8–20% |
| $Li_2O$ | up to 2.5% | $ZrO_2$ | up to 6% |
| | | $TiO_2$ | up to 3% |

In addition, the glass contains, as essential ingredients to impart photochromic properties, in weight %:

| | |
|---|---|
| Ag | 0.15–0.3% |
| Cl | 0.1–0.25% |
| Br | 0.1–0.2% |
| CuO | 0.004–0.02% |

The same glass colorants, NiO and $Co_3O_4$, are employed to produce the desired fixed tint. Surprisingly, markedly changing the amounts of these colorants in the correct proportions is sufficient to achieve the desired color properties and photochromic characteristics in the glass.

The amount of each colorant employed depends on the thickness of the glass. The standard lens thickness is 2.0+/−0.1 mm. For this lens, the glass will contain, in percent by weight, 0.27–0.32% NiO and 0.035–0.050% $Co_3O_4$.

Lenses for clip-on glasses are not required to meet the strength requirement of regular lenses. Hence, their standard thickness is 1.6+/−0.1 mm. For this thinner glass, the NiO content must be 0.32–0.38% and the $Co_3O_4$ content must be 0.040–0.060%.

To arrive at the desired color package, a series of color glass melts were made using the commercial photochromic glass composition shown earlier. The two composition variables were the NiO and $Co_3O_4$ contents. The criticality of the ranges specified can be seen from a comparison of 2 mm. thick lenses, a lens being pressed from each of the five melts shown in the TABLE below. The TABLE reports analyzed contents for NiO and $Co_3O_4$ in weight percent, and the luminous transmittance (LT) values as calculated for each glass, the calculations made from measurements on the lenses after hydrogen treatment.

TABLE I

| | NiO | $Co_3O_4$ | LT |
|---|---|---|---|
| 1 | 0.19 | 0.024 | 61 |
| 2 | 0.24 | 0.031 | 55 |
| 3 | 0.29 | 0.039 | 50 |
| 4 | 0.30 | 0.046 | 46 |
| 5 | 0.36 | 0.054 | 41 |

Visual testing indicated that lenses formed from glass melts 1 and 2 had initial transmittance values that were too high after hydrogen heat treatment. Lenses molded from melts 3 and 4 in 2 mm. thickness had a satisfactory transmittance and color after subsequent treatment. For a 2 mm. thick lens, the optimum colorant contents appear to be about 0.29–0.30% NiO and about 0.046% $Co_3O_4$ with the glass having a luminous transmittance value of about 47+/−2.

The lens of melt 5 had a lower initial luminous transmittance than desired for a 2 mm. thick lens, but the melt would be suitable for a 1.6 mm. lens.

A 1.6 mm. lens would require larger contents of both colorants, primarily the $Co_3O_4$ constituent. Thus, an optimum for this thickness lens was calculated to be about 0.35% NiO and 0.050% $Co_3O_4$.

It will be appreciated that the final color properties are obtained by heat treating a lens in a reducing atmosphere. A virtue of the present invention is that the standard treatment heretofore used is equally effective with the present glass. This would be expected, since the photochromic constituents, particularly the silver, remain unchanged. Silver is the constituent affected by the reducing treatment.

The standard treatment is heating in a pure hydrogen atmosphere for about 12–13 minutes at 385° C. Any treatment providing an equivalent effect is contemplated. Since equipment and other influences will vary, a treatment in the ranges of 350–400° C., and a period of 10–15 minutes should prove satisfactory. It may be mecessary, under some circumstances, to use a diluted hydrogen atmosphere. This will require a longer heat treatment up to about thirty minutes.

Since the base glass composition remains unchanged, the lenses of the invention may be strengthened in known manner to meet FDA requirements. Strengthening may be accomplished by chemical tempering in well known manner.

Photochromic behavior will also be developed in the usual manner. Thus, the glass, after forming, may be heat treated at about 651° C. for forty minutes to precipitate in the glass the requisite silver halide crystals.

A polished sample having a nominal thickness of 2.0 mm. was prepared for comparison with a corresponding sample of the commercial glass referred to earlier. The latter is the glass that gave rise to the present invention. Both samples were fired in a 100% hydrogen atmosphere using the standard commercial cycle of 12–13 minutes at 385° C.

TABLE II compares the transmission in percent of the present commercial glass lens M with a 2 mm. glass N of the present invention under various conditions of treatment. The conditions are (1) the glass as formed (before $H_2$), (2) after heat treatment in hydrogen (after $H_2$), (3) with the neutral density coating (coated) and (4) after darkening with UV radiation (dark).

TABLE II

| | M | N |
|---|---|---|
| Before $H_2$ | 70 | 45 |
| After $H_2$ | 45 | 30 |
| Coated | 26 | NA |
| Darkened | 12 | 16 |

The single FIGURE in the accompanying drawing shows the spectral transmittance curves for the sample of the present glass. The curve based on measurements on the sample before the hydrogen treatment is designated A. The curve, as measured on the sample, after firing in hydrogen, is designated B. In the FIGURE, spectral wavelength is plotted on the horizontal axis and transmittance in percent is plotted on the vertical axis.

Tristimulus values X, Y, and Z, were computed from the indicated measurements using a weighted ordinate method with the 1931 CIE Standard Observer and Illuminate C. Chromaticity coordinates x and y, and luminous transmittance Y values, are given in TABLE III below. Columns 1 and 2 show, respectively, the measurements made on an unfired and fired sample of the standard commercial glass. Columns 3 and 4 show, respectively, the measurements made on an unfired and fired sample of the present new glass.

TABLE III

| Parameter | 1 | 2 | 3 | 4 |
|---|---|---|---|---|
| x | 0.3410 | 0.3815 | 0.3601 | 0.4100 |
| y | 0.3455 | 0.3392 | 0.3790 | 0.3625 |
| Y | 70.0 | 48.0 | 47.7 | 30.0 |

We claim:

1. A fixed tint, photochromic glass having an $R_2O$—$Al_2O_3$—$B_2O_3$—$SiO_2$ base composition, containing silver chloride and bromide contents as photochromic constituents, and 0.27–0.38% by weight NiO and 0.035–0.060% by weight $Co_3O_4$ as glass colorants, the weight ratio of NiO:$Co_3O_4$ being at least 6:1.

2. A glass in accordance with claim 1 containing as essential constituents to impart photochromic properties 0.15–0.3% Ag, 0.1–0.25% Cl, 0.1–0.2% Br and 0.004–0.02% CuO by weight.

3. A glass in accordance with claim 1 wherein the base glass composition, exclusive of photochromic constituents and glass colorants and in weight percent on an oxide basis, consists essentially of:

| | | | |
|---|---|---|---|
| $SiO_2$ | 20–65% | $Na_2O$ | up to 9% |
| $Al_2O_3$ | 5–25% | $K_2O$ | up to 17% |
| $B_2O_3$ | 14–23% | $R_2O$ | 8–20% |
| $Li_2O$ | up to 2.5% | $ZrO_2$ | up to 6% |
| | | $TiO_2$ | up to 3% |

4. A glass in accordance with claim 1 having a base glass composition containing the following oxides in weight percent in the approximate amounts of:

| | | | |
|---|---|---|---|
| $SiO_2$ | 56.46 | $Na_2O$ | 4.08 |
| $Al_2O_3$ | 6.19 | $K_2O$ | 5.72 |
| $B_2O_3$ | 18.15 | $ZrO_2$ | 4.99 |
| $Li_2O$ | 1.81 | $TiO_2$ | 2.09 | and containing photochromic constituents as analyzed in weight percent:

| | |
|---|---|
| Ag | 0.202 |
| Cl | 0.207 |
| Br | 0.130 |
| CuO | 0.0085 | and containing colorants as analyzed in weight percent:

| | |
|---|---|
| NiO | 0.27–0.38% |
| $Co_3O_4$ | 0.035–0.060% |

5. A fixed tint, photochromic sunglass lens having a refractive index of 1.53, capable of being chemically strengthened, having a thickness of 1.6–2.0 +/−0.1 mm., having an $R_2O$—$Al_2O_3$—$B_2O_3$—$SiO_2$ base glass composition containing silver chloride and bromide contents as photochromic constituents and containing as glass colorants to impart a fixed tint 0.27–0.38% NiO and 0.035–0.060% $Co_3O_4$ by weight and in a weight ratio of at least 6:1.

6. A sunglass lens in accordance with claim 5 wherein the glass lens has a thickness of 2.0+/−0.1 mm. and the colorant contents are 0.27–32% NiO and 0.035–0.050% $Co_3O_4$.

7. A sunglass lens in accordance with claim 5 wherein the glass has a thickness of 1.6+/−0.1 mm. and the colorant contents are 0.32–0.38% NiO and 0.040–0.060% $Co_3O_4$.

8. A sunglass lens in accordance with claim 5 in which the glass contains, as essential constituents to impart photochromic properties: Ag 0.15–0.3%, 0.1–0.25% Cl, 0.1–0.2% Br and 0.004–0.02% CuO.

9. A sunglass lens in accordance with claim 5 in which the lens has a base glass composition, exclusive of photochromic constituents and glass colorants, consists essentially of, in weight percent on an oxide basis:

| | | | |
|---|---|---|---|
| $SiO_2$ | 20–65% | $Na_2O$ | up to 9% |
| $Al_2O_3$ | 5–25% | $K_2O$ | up to 17% |
| $B_2O_3$ | 14–23% | $R_2O$ | 8–20% |
| $Li_2O$ | up to 2.5% | $ZrO_2$ | up to 6% |
| | | $TiO_2$ | up to 3% |

10. A sunglass lens wherein the lens has a glass composition as set forth in claim 4.

* * * * *